United States Patent
Lanzatella et al.

(10) Patent No.: US 7,272,619 B1
(45) Date of Patent: *Sep. 18, 2007

(54) METHODS AND SYSTEMS TO BACKUP DATA

(75) Inventors: Thomas W. Lanzatella, Minneapolis, MN (US); Graham Bromley, Dublin, CA (US); Weibao Wu, Roseville, MN (US)

(73) Assignee: VERITAS Operating Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/970,541

(22) Filed: Oct. 21, 2004

Related U.S. Application Data

(63) Continuation of application No. 10/086,597, filed on Feb. 28, 2002.

(51) Int. Cl.
*G06F 17/30* (2006.01)

(52) U.S. Cl. ............ 707/204; 707/200; 707/203; 707/205; 707/206

(58) Field of Classification Search ........ 707/200–205; 711/162–163
See application file for complete search history.

(56) References Cited

U.S. PATENT DOCUMENTS

| | | | |
|---|---|---|---|
| 5,991,542 A | 11/1999 | Han et al. | |
| 6,029,168 A | 2/2000 | Frey | |
| 6,085,298 A | 7/2000 | Ohran | |
| 6,161,111 A * | 12/2000 | Mutalik et al. | 707/205 |
| 6,249,527 B1 * | 6/2001 | Verthein et al. | 370/466 |
| 6,269,431 B1 * | 7/2001 | Dunham | 711/162 |
| 6,360,330 B1 * | 3/2002 | Mutalik et al. | 714/4 |
| 6,542,962 B2 | 4/2003 | Kodama et al. | |
| 6,567,774 B1 * | 5/2003 | Lee et al. | 703/23 |
| 6,640,278 B1 | 10/2003 | Nolan et al. | |

(Continued)

OTHER PUBLICATIONS

"Storage Area Networking—High-Speed Data Sharing Among Multiple Computer Platforms," Tivoli Systems, Inc., 2000, http://www.tivoli.com/products/documents/whitepapers/san_datasharing_wp.pdf, 4 pages.

(Continued)

*Primary Examiner*—Cam Y T Truong
(74) *Attorney, Agent, or Firm*—Meyertons Hood Kivlin Kowert & Goetzel, P.C.; Rory D. Rankin

(57) ABSTRACT

Methods and systems to backup data are provided. A first computing device identifies data to backup and stabilizes a frozen image of that data. Next, the frozen image is decomposed into physical storage addresses housing the data. The decomposed storage addresses are sent to a second computing device. The second computing device uses the storage addresses along with existing operating system I/O operations to backup the data to computer readable media.

22 Claims, 4 Drawing Sheets

U.S. PATENT DOCUMENTS

| | | | |
|---|---|---|---|
| 6,714,952 B2 * | 3/2004 | Dunham et al. | 707/204 |
| 6,934,725 B1 * | 8/2005 | Dings | 707/204 |
| 6,978,324 B1 * | 12/2005 | Black | 710/31 |
| 7,099,900 B1 * | 8/2006 | Bromley et al. | 707/204 |

OTHER PUBLICATIONS

"Storage Management-Best Practices," IBM Corporation, 2001, http://www.tivoli.com/products/documents/whitepapers/wp-storage-bp.pdf, 11 pages.

Amiri, Khalil S., "Scalable and manageable storage systems," Ph.D. Thesis, Department of Electrical and Computer Engineering, Carnegie Mellon University, Pittsburgh, PA., http://ww.pdl.cmu.edu/PDL-FTP/NASD/amiri_thesis.pdf, pp. i-241, Dec. 2000.

Wylie, Jay J., et al., "Selecting the Right Data Distribution Scheme for a Survivable Storage System," Research Paper, School of Computer Science, Carnegie Mellon University, Pittsburgh, PA, http://www.pdl.cmu.edu/PDL-FTP/Storage/CMU-CS-01-120.pdf, pp. 1-21, May 2001.

* cited by examiner

METHODS AND SYSTEMS TO BACKUP DATA

This application is a continuation of U.S. patent application Ser. No. 10/086,597, entitled "METHODS AND SYSTEMS TO BACKUP DATA", filed Feb. 28, 2002.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright © 2002, VERITAS Software Company., All Rights Reserved.

CROSS-REFERENCE TO RELATED APPLICATIONS

This application is related to the following co-pending, commonly assigned U.S. patent applications: "Methods, Functional Data, and Systems to Represent a Storage Environment," Ser. No. 09/997,602 filed Nov. 29, 2001; "Methods, Systems, and Apparatus to Interface with Storage Objects," Ser. No. 09/997,612 filed Nov. 29, 2001; "Systems, Methods, and Apparatus for Creating Stable Disk Images", Ser. No. 09/997,350, filed Nov. 29, 2001; and "Methods and Systems to Interface Storage Objects,", Ser. No. 10/087,230, filed Nov. 29, 2001, each of which is herein incorporated by reference in its entirety.

FIELD OF THE INVENTION

The present invention is related to backing up data, and more particularly to methods and systems to backup data in a storage area network (SAN).

BACKGROUND INFORMATION

Storage networking is the practice of connecting storage devices to computing devices (e.g., clients, servers, and the like) by using Fibre Channel networks instead of traditional point-to-point small computer system interface (SCSI) channels. A network used to connect servers to storage devices is referred to as a storage area network (SAN). Within a SAN environment, all computing devices have access to the available storage devices. This presents a wide variety of benefits, including server platform fail-over wherein a failed storage device is automatically recovered by another operational server platform without requiring any recabling of the storage devices themselves. As will be apparent to one of ordinary skill in the art, connectivity among the computing devices and the underlying storage devices within the SAN environment is shared. Prior to the development of SAN technology, local and wide area networks provided connectivity between computing devices that did not include storage devices. Connections were established with network protocols such as Transmission Communication Protocol (TCP), Unreliable Datagram Protocol (UDP), and others. These protocols ensure that message ordering is preserved and that messages are not lost. Distributed File Systems such as network file system (NFS) and Common Internet file system (CIFS) are layered on top of network protocols. Distributed File Systems organize access to files and correspondingly data storage elements across a network consisting of heterogeneous computing devices. The computing devices are typically organized as clients and servers, in a client-server architecture. Access to files or data storage elements is transparent to any particular computing device, such that access is consistent across the distributed file system without the need to have any private information about the physical locations or details associated with any particular file or data element.

The convenience of distributed file systems comes with an expense, since every byte of data exported by a file server managing a distributed file system must pass through the file server's memory, through the communications stack, and through a network interface controller before it reaches the application. Accordingly, the low performance and low throughput of operation associated with distributed file systems prohibit the implementation of many high performance data-sharing applications such as large scale distributed database applications, backup applications and the like. SAN environments present the opportunity to alleviate this issue by elevating storage devices within the network to peers of the clients and the servers, thereby in theory providing the opportunity for improving throughput of operation.

Yet, SAN technology has not produced advances in throughput of operations, as one might anticipate. This is due to the fact that shared access to data among several compute platforms must be mediated by distributed file systems. Consequently, while the speed of connections between platforms has scaled upward with the introduction of SAN, the basic method of using distributed file systems to share data has not changed. Distributed file systems are innately restricted in the level of performance that can be achieved due to the computing overhead introduced by the communication protocol. Consequently, application writers are motivated to find strategies other than distributed file system in order to share data at speeds that are consistent with SAN technology. These strategies typically employ sharing information about files and volumes with remote application components. Using this information, an application can know everything about a file without having access to the file through a distributed file system. Additionally, the application can use this information to reference data directly on the SAN-connected storage device.

For these strategies to succeed, applications need to be able to discover sufficient information about files and volumes that a component on another platform can access the data associated with the file or volume. Customarily, this type of information is not externalized by either file systems or distributed file systems. As used herein this is referred to as private information. Private information differs from one file system operating on one computing device within the SAN and another file system operating on another computing device within the SAN. Correspondingly, data storage element portability is difficult to achieve within the confines of present SAN technology, since existing software techniques being used do not take advantage of the SAN's shared connectivity and architecture.

Furthermore, the very purpose of file system and volume manager function within an operating system is to hide the private information related to data storage elements located on one or more data storage devices. Accordingly, operating system vendors, file system vendors or volume manager vendors do not reveal or provide any useful interfaces that provide access to private information. Moreover, storage environment software stacks are complex and trying to extract the private information from existing stacks is not readily achievable without intervention from the file system software or volume manager software itself.

Processing latency, within a SAN environment, is particularly conspicuous during the operation of a common and necessary data backup. During a data backup operation often-voluminous quantities of data bits are transferred from target storage devices to destination storage devices. As the data bits are transferred, the processing throughputs experienced by the server that owns the data and executes the backup operation are noticeably degraded. Before any data backup within the storage environment can occur, the data being backed up must be stabilized and temporarily locked until a consistent transactional version of the data is acquired from the SAN environment and successfully written to the target storage devices.

Stability requires flushing pending operations, which can alter the transactional consistency of the backup operation, from volatile cache memory to the appropriate target storage devices before copying the data from the target storage devices to the destination storage devices. In a typical SAN environment, a number of write operations, which can alter the data to be backed up, can be in various stages of completion when a request to perform a backup operation is received. Accordingly, transactional consistency and temporal stability of the data must be acquired by flushing and completing the pending write operations for the data.

The stabilized data, which resides on the target storage devices, is referred to as a "frozen image." The frozen image will include one or more storage data elements within the SAN environment. Further, the frozen image is created using snapshot and/or mirroring techniques, these techniques are well known to one of ordinary skill in the art. Typically, the same computing device requesting a data backup operation within the SAN environment also initiates and performs the transfer of data bits from the target storage devices to the destination storage devices, resulting in unusually high data volume and traffic on the computing device and within the SAN environment as a whole. Moreover, the data backup operation is performed as a series of customized operations designed to handle a variety of errors that can occur during read operations, write operations, copy operations (e.g., combined read and write operations), or move operations (e.g., combined read, write, and delete operations).

Moreover private information about individual data storage elements is in a continual state of flux in modern data storage architectures, since at any moment in time data storage elements are moved during storage device failure, devices are reorganized to reduce fragmentation, and the like. Therefore, any ability to acquire private information must also entail notification that private data has been changed. Otherwise, the acquired private information may be stale or inaccurate. This is particularly significant in performing data backup operations, since during an intervening period of time occurring after a data backup operation is initiated but before the backup operation is actually processed, the data storage elements can be modified resulting in the incorrect transfer of some data to the destination storage devices.

In an effort to address some of these problems some industry associations have been initiated in an attempt to standardize data storage device communication. For example, the Storage Network Industry Association (SNIA) and the National Committee for Information Technology Standards (NCITS) technical committee T11 have been established. Yet, these associations are attempting to gain voluntary standardization for storage device manufacturers to adhere to when developing storage devices, and therefore the work of these associations will not assist with existing storage devices, existing operating systems, existing file systems or existing volume managers. Accordingly, the success of these associations is limited in scope and has yet to be demonstrated even with newly released products and services.

Therefore, what is needed are methods and systems for improved data backup within a SAN environment, such that the shared connectivity of computing devices and storage devices are more fully utilized to cooperate and improve on the processing throughput associated with data backup operations within the SAN environment. As one of ordinary skill in the art will understand upon reading the present invention, this will result in reducing the computing overhead associated with backup on the backup server and allow the backup to be directed to a frozen image of the source data thus reducing the impact of backup processing on the backup server owning the data.

SUMMARY OF THE INVENTION

According to one aspect of the present invention, a method to backup data from a storage environment is provided. Initially, storage extents are received, the storage extents are associated with a frozen image, which represents the data as it resides in the storage environment at a particular point in time. Next, operating system input/output (I/O) operations are constructed using storage extents and issued to one or more storage devices housing the frozen image. Furthermore, one or more of the operating system I/O operations are issued to a storage media to write the data to the storage media.

According to another aspect of the present invention, a method to backup data within a storage environment is provided. Target data is identified for backup within the storage environment from a first computing device. The first computing device produces a frozen image of the target data, and the frozen image is decomposed into physical storage addresses on the first computing device. The first computing device then transmits the physical storage addresses to a second computing device. The second computing device issues operating system provided input/output (I/O) operations using the physical storage addresses to copy the target data to a non-volatile storage.

According to still another aspect of the present invention, a data backup system is provided. The system includes a SAN having a plurality of storage devices, where one or more of the storage devices house at least a portion of target data that is to be backed up within the SAN. Moreover, the system includes a first computing device interfaced to the SAN, a second computing device interfaced to the SAN, and a backup set of executable instructions. The first computing device creates a frozen image of the target data from one or more of the storage devices, which house at least a portion of the target data, and from volatile memory, associated with the first computing device. The volatile memory includes any remaining portion of the target data not housed in one or more of the storage devices. Furthermore, the first computing device creates a storage map of the frozen image. The storage map includes storage device identifiers, start blocks, and numbers of blocks to process. The second computing device receives the storage map from the first computing device. Next, the second computing device uses the backup set of executable instructions to backup the target data within the SAN by issuing storage operations to read the target data and write the target data to a computer readable medium using the storage map.

DESCRIPTION OF THE PREFERRED EMBODIMENTS

Figure 1:
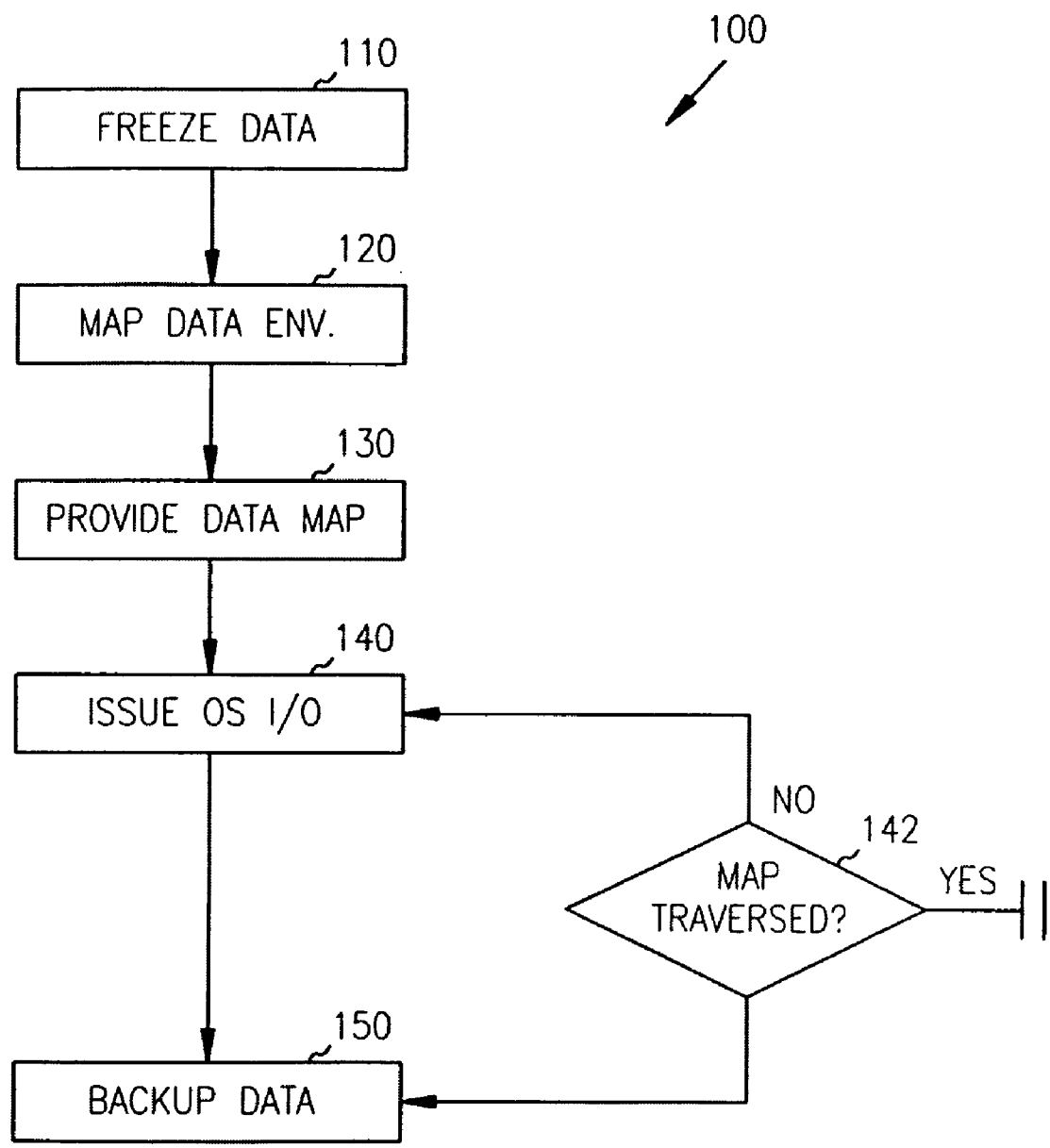
FIG. 1 shows one flowchart of a method to backup data from a storage environment according to the present invention.

In the following detailed description of various embodiments of the present invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed description which follows are presented in terms of algorithms and symbolic representations of operations on data bits within a computer memory. These algorithmic descriptions and representations are the ways used by those skilled in the data processing arts too most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Furthermore, as used herein a computing device includes one or more processing elements coupled with computer readable memory that can be volatile or nonvolatile memory or any combination thereof. Moreover, as used herein "data" refers to one or more storage data elements, which can include portions of files, a single file, sets of files, a single file system, sets of file systems, a database, a storage device partition, a volume, sets of volumes, and the like. The data need not reside on a single storage device, since the data can span multiple storage devices. Additionally, the phrase "backup operation" includes a series of operations, embodied as executable instructions, necessary to successfully stabilize the data, read the stabilized data, and write the stabilized data to one or more destination storage devices or destination storage computer readable media.

Moreover, the terms and phrases "extents," "storage addresses," and "storage map" are used synonymously herein. These terms refer to information that can be used by executable instructions to uniquely identify and potentially access one or more physical storage locations on one or more physical storage devices within a storage environment. The storage locations are associated with storage elements included within the data that is to be backed up. The information includes either directly or indirectly (e.g., through the use of an application programming interface (API) library) the private information about each storage element included within the data. Moreover, the information can be absolute or relative, but if the information is relative additional information is provided such that at some point the information includes absolute physical storage locations for the data.

Initially, the data that is to be backed up is identified on a first computing device. The first computing device then executes a data backup operation. The backup operation initially processes a frozen image set of executable instructions. The frozen image set of executable instructions, presented as an API in some embodiments, produces a stable version of the data on storage devices within a SAN environment. The frozen image ensures that the data is stabilized, thereby providing transactional consistency for the backup operation. As previously discussed, production of the frozen image can be achieved with a number techniques, known to one of ordinary skill in the art (e.g., snapshot techniques, mirroring techniques, and others). Essentially, the frozen image set of executable instructions flushes and completes any data altering operations (e.g., write operations) which are pending in volatile memory of the first computing device, or other computing devices participating within the SAN, when the data backup operation is received. Of course as one of ordinary skill in the art will appreciate, producing the frozen image entails a number of other operations such as and by way of example only, quiescing storage stacks, applications, and the like.

In some embodiments, once the frozen image is obtained and the data desired to be backed up stabilized, the backup operation interfaces with one or more modules, which are included within an application programming interface (API) library, to acquire a logical representation of each storage element included within the data. The API provides efficient access and an interface to each of the storage elements within the data. One such logical representation in one embodiment is achieved by mapping the structure of the storage element within the storage environment. This mapping populates a predefined data structure. The data structure is manipulated, as appropriate, by the API that retains knowledge about the format and structure of the predefined data structure. However, the backup operation using the API need not know the format or structure of the predefined data structure.

Of course as will be readily apparent to those skilled in the art, the mapping need not be a single data structure or any data structure at all since any rules-based application, which normalizes the mapping of the storage element, is acceptable when the API has access to the appropriate rules to interface with the normalized mapping.

Next in some embodiments, the data structure representing the physical storage addresses and map for each storage element within the data can be provided as one or more storage extents. An extent, in some embodiments, is represented as a tuple consisting of a storage device identifier, a starting block or location within a storage device identified by the storage device identifier, and an integer number representing a number of blocks or storage units to process for a specific tuple. A single storage element can be represented by one or more extents. Moreover, extents can be relative or absolute. For example, a file system may only resolve storage elements using volume relative extents, where a volume manager handles abstracting storage elements at the storage device level. In this way, a chain of extents provide a complete link or map to the physical storage locations for each storage element included within the data to be backed up.

Correspondingly, as one of ordinary skill in the art will appreciate, having the generated extents for the data allows the backup operation to communicate those extents to a second computing device operating within the SAN. Once the second computing device has the extents, the second computing devices is capable of completing the backup operation on behalf of the first computing device, thereby eliminating the processing burden from the first computing device associated with copying the data from the target storage devices to the destination storage devices. In some embodiments, the second computing device is dedicated to performing backup operations or similar management operations within the SAN, in this way the performance of the first computing device initiating the backup operation is improved, since a second computing device actually handling the processing intensive portions of the backup operation, namely reading the data from the target storage devices and writing the data to the destination storage devices.

Moreover in some embodiments, each frozen image of the data receives a configuration identification that is validated each time a referencing computing device attempts to access the data. If one or more of the storage elements associated with the data has been moved, altered, or modified in anyway, this identification notifies the referencing computing device of the change and an update to the extents or map of the data can be obtained either automatically or manually from the referencing computing device. Accordingly, the frozen image's logical representation within the storage environment is validated and/or modified as necessary. This will result in a more accurate view of the data represented in the frozen image and a more accurate method that accounts for changes that might occur in the frozen image before completing the backup operation. Moreover and as one of ordinary skill in the art will readily recognize, the ability to remap the frozen image obtaining only changes, which may have occurred, and not having to recreate the entire frozen image map for any given single change to the frozen image, provides significant processing improvement for indirect backup operations. As defined herein, an indirect backup operation is a backup operation processed by a computing device that did not initially issue a request to perform the backup operation.

Once the second computing device has the extents or map of the data desired to be backed up, the extents or map can be used in combination with existing operating system (OS) I/O operations to satisfy and complete the backup operation for the data. For example, with a UNIX OS the second computing device can use the extents to perform seek operations, read operations, and write operations from/to the target and destination storage devices within the SAN. By using the existing OS operations to access the target and destination storage devices within the SAN, customized error processing is avoided altogether during the backup operation because the OS on the second computing device provides error recovery services.

Existing backup techniques occurring within a SAN environment do not use existing OS provided operations to perform backup operation. Conventionally, it is considered undesirable to do this, because of the quantity of I/O operational errors that occur during a typical data backup operation. However, most of these errors are actually "soft errors" which are easily resolved by the OS itself and readily resubmitted for proper processing. For example, a write operation to a magnetic tape may experience a parity error on a first write attempt, yet a second write attempt will process successfully with no recurring parity error. Accordingly, contrary to conventional practices for indirect data backup operations, it is in fact desirable to permit the OS with OS provided I/O operations to process the backup operation, since, by and large, all I/O errors occurring during a normal data backup operation, are soft errors that are seamlessly and readily resolved by the OS without the need for customized programming intervention. Further, the OS of a first computing device can be different from the OS on a second computing device for purposes of the present invention.

FIG. 1 illustrates one flowchart of one method 100 to backup data from a storage environment, according to the teaching of the present invention. Initially, the data that is to be backed up is identified on a first computing device. The data includes one or more storage elements, which physically reside on one or more storage devices. The data is identified on a first computing device. Identification can occur via any manually driven set of selection executable instructions (e.g., user-defined graphical user interface (GUI) used to select specific files, directories, file systems, or volumes to be backed up), or through automated selection using automated sets of executable instructions (e.g., time-driven daemons or cron scripts which select specific files, directories, file systems, or volumes for backup on specific dates or at specific periods/intervals). The storage devices and the first computing device are connected and interfaced to one another through a shared storage environment. In some embodiments, the shared storage environment is a SAN environment.

In block 110, after the data to be backed up is identified, the data is stabilized, thereby creating a frozen image of the data. In other words, the data is stabilized at a point in time when the backup process requests the frozen image to be created. This ensures transactional consistency for application data within the frozen image. To acquire the stable version of the data, any cache associated the first computing device in the shared storage environment is flushed. This causes any pending I/O operations held in the cache to complete. Thus, the storage devices housing the data have a complete and accurate representation of the data.

In block 120, the frozen image is used in combination with APIs on the first computing device to map the frozen image as it exists in the shared storage environment. The generated map includes sufficient information to allow a second computing device, to use the map to access the storage elements represented and identified in the map. In block 130, the generated map is provided to the second computing device. In block 140, the second computing device issues a plurality of OS I/O operations using the map to transfer the data from source to destination storage devices or storage media in order to satisfy the backup process, which was initiated on the first computing device. In block 142, the second computing device inspects the provided map to see if the map has been fully traversed, and if the map has been fully traversed the backup process is complete, otherwise the second computing device continues in block 140 to issue OS I/O to satisfy the backup process. As the I/O processes the data is backed up, as is depicted in block 150.

The second computing device is connected to the same shared storage environment as the first computing device and the storage devices. And, in one embodiment the shared storage environment is a SAN environment. Furthermore, the second computing device includes a variety of executable instructions permitting the second computing device to receive the map and process the OS I/O to satisfy the backup process. In this way, the second computing device uses existing OS I/O operations and the map of the frozen image to complete the backup process on behalf of the first computing device. By using existing OS provided I/O operations the second computing device more efficiently accesses the data and transfers the data from target storage devices to destination storage devices. And, the first computing device will not experience any processing latency associated with performing the data backup, since the second computing device is actually performing the I/O operations to effectuate the data backup.

Figure 2:
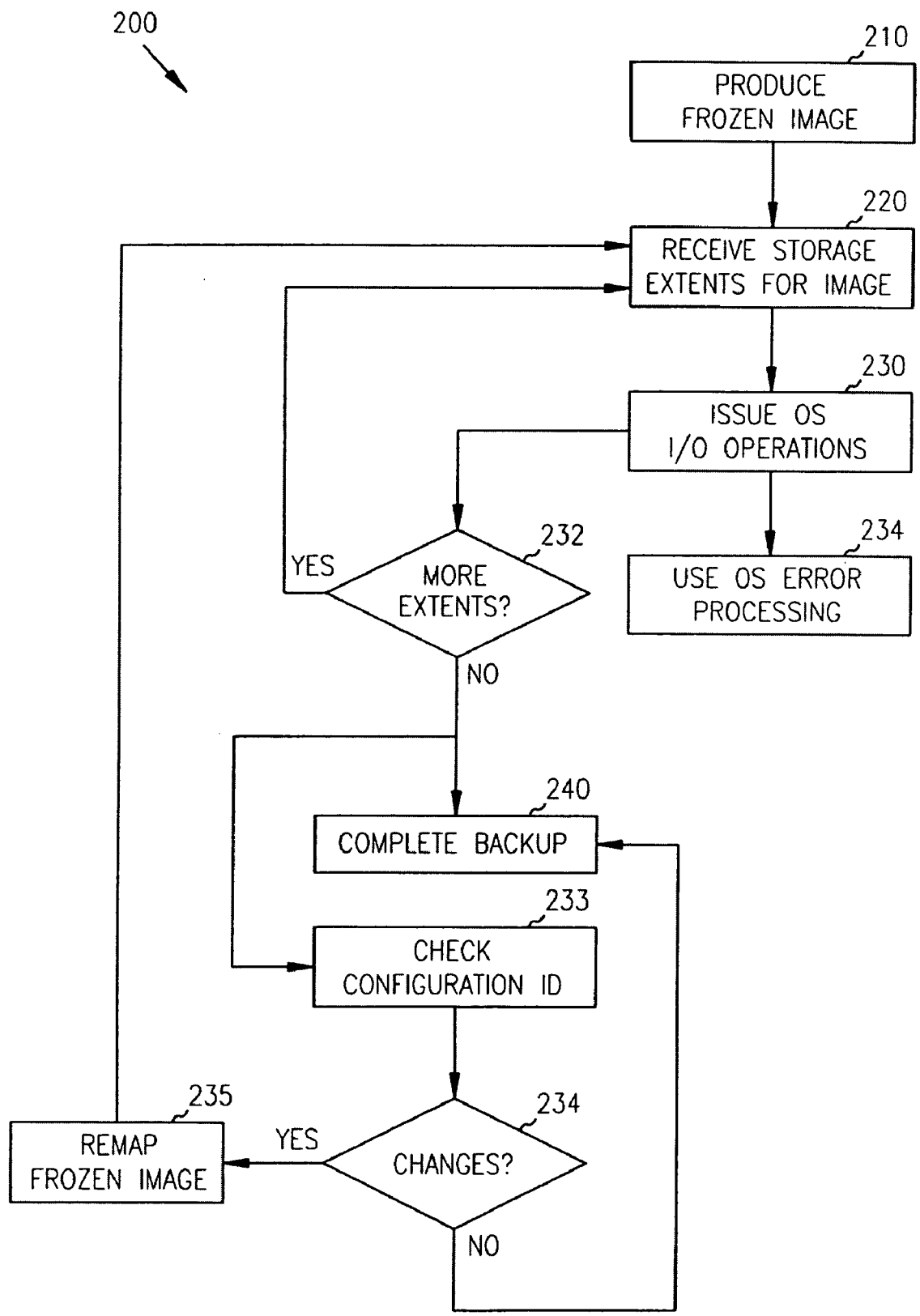
FIG. 2 shows another flowchart of a method to backup data from a storage environment according to the present invention.

FIG. 2 illustrates another flowchart of another method 200 to backup data from a storage environment, according to the teaching of the present invention. Initially, the data to be backed up is identified and stabilized. Stabilization can occur by producing a frozen image as depicted in block 210. The identified data is controlled and accessible by a first computing device, and correspondingly the first computing device produces the frozen image. Once the data is stabilized and represented in the frozen image, the first computing device produces storage extents associated with the frozen image. In some embodiments, the storage extents are both relative storage extents and absolute storage extents. The storage extents combine to form a map to each storage element associated with the data included within the frozen image. The map provides access to the physical storage locations within the storage environment controlled by the first computing device.

In block 220, a second computing device receives the storage extents after being sent from the first computing device to the second computing device. Optionally, the second computing device can indirectly use a configuration identifier that is associated with the received storage extents. The configuration identifier is used by the first computing device whenever any of the storage elements represented by the storage extents are accessed, and if any modifications have occurred during the interval that the storage extents were first generated by the first computing device and when the second computing device attempts to use the storage extents, a changed configuration identifier is detected by the first computing device. In this way, the second computing device can receive from the first computing device any changes that have occurred with the frozen image of the data desired to be backed up. And, if changes have occurred then the second computing device receives only the changed storage extents associated with the changes occurring with the frozen image. As one of ordinary skill in the art will readily appreciate, this saves a considerable amount of processing that would normally be necessary to re-stabilize the data and produce a new frozen image for purposes of data backup.

In block 230, the second computing device uses the storage extents received from the first computing device to issue one or more OS provided I/O operations to access each storage element as it exists in the storage environment and as controlled by the first computing device. In some embodiments, the I/O operations are a series of reads and writes. In other embodiments, the I/O operations are copy operations that functionally perform the reads and writes. During the execution of the I/O operations, any errors produced are detected and handled by the existing OS and its error handling facilities. For example, parity errors are immediately detected by the OS and the affected I/O operation resubmitted for processing without any customized intervention being required on the second computing device. Of course as one of ordinary skill in the art will readily appreciate, a variety of I/O errors and error handling techniques can be deployed and used by the OS in addition to standard parity errors, all of which are intended to fall within the scope of the present invention.

In block 232, after processing a single storage extent a check is performed to determine if all storage extents associated with the frozen image have been detected and processed by the second computing device. And, if all storage extents have been processed, then in block 240 the data backup operation and process is complete. However, if more extents exist then in block 220 the storage extents are received and processing continues as described above.

Moreover, in some embodiments, before completing the backup operation, the second computing device checks to see if a configuration identifier associated with the frozen image has been altered in anyway in block 233. And, in block 234 if changes to the configuration identifier are detected then a remapped frozen image is produced in block 235, and only the changes in the remapped frozen image are sent back to block 220 for continued processing. If no changes occur to the configuration identifier associated with the frozen image then the backup operation is completed in block 240.

In some embodiments the I/O issued results in the data being copied for purposes of backup to storage media. Storage media can include any computer readable medium, such as optical disks, magnetic disks, magnetic tapes, magnetic cartridges, and the like. Moreover and in more embodiments, the first computing device, the second computing device, and the storage devices are connected and interfaced to one another in a shared computing environment, such as a SAN. Additionally, the data can include a file, a set of files, a file system, a set of file systems, a volume, a set of volumes, and the like.

Figure 3:
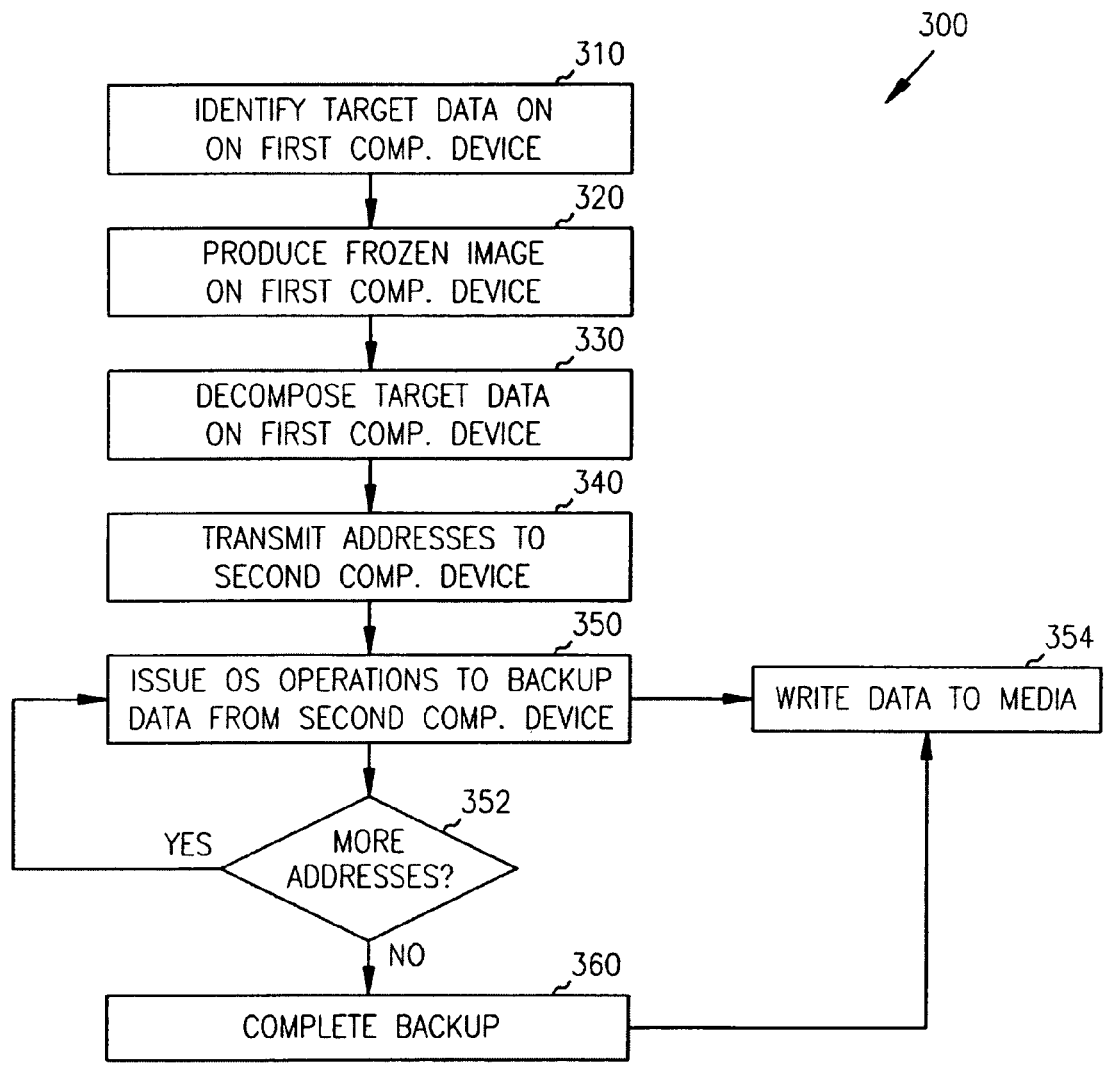
FIG. 3 shows still another flowchart of a method to backup data from a storage environment according to the present invention.

FIG. 3 illustrates still another flowchart of one method 300 to backup data from a storage environment according to the present invention. In block 310, target data is identified within the storage environment. The target data is associated with the data that is to be backed up within the storage environment, and the target data is identified from a first computing device. Once the target data is identified, the target data is stabilized for purposes of creating transactional consistency of the application's data. In one embodiment, stability is achieved by producing a frozen image of the target data as depicted in block 320. Again, the frozen image is produced in block 320 on the first computing device.

Next, in block 330 the frozen image is decomposed into physical storage addresses. The physical storage addresses include absolute and relative storage extents representing a complete map of each storage element represented in the target data in the storage environment. In block 340 the storage addresses are transmitted to a second computing device for processing.

In block 350, the second computing device issues OS I/O operations to backup the target data within the storage environment using the storage addresses to copy the target data to non-volatile storage. In block 354, the I/O operations result in the target data being written to computer readable media. In some embodiments, the non-volatile storage media is a magnetic tape. In more embodiments, the target data is a file, a set of files, a file system, a set of file systems, a volume, or a set of volumes.

A check is made in block 352 to determine if more storage addresses associated with the frozen image are detected, and if detected then method 300 iterates all the available storage addresses on the second computing device by revisiting block 350 to issues OS I/O operations for all storage addresses. Once the second computing device processes all storage addresses, associated with the frozen image, the data backup is completed in block 360, with all target data written to the computer readable media in block 354.

In some embodiments the first computing device, the second computing device, and the storage devices housing the target data are all connected and interfaced via a shared computing environment, such as a SAN. Moreover, the operating system used can be Unix, Windows 2000, Windows XP, Windows NT, Linux, HP-UX, AIX, Solaris, Netware, OS/2, or any other operating system. Further, in some embodiments, the I/O operations are read, write, and/or copy operations, and each operation includes parameters associated with a storage device identifier, a starting block within a storage device identified by the storage device identifier, and a total number of blocks to process/read within the storage device beginning at the starting block. In this way, the storage addresses are used along with existing OS I/O operations by the second computing device to directly and efficiently accesses the physical locations and devices housing the target data to backup the target data to the storage media without burdening the first computing device.

Figure 4:
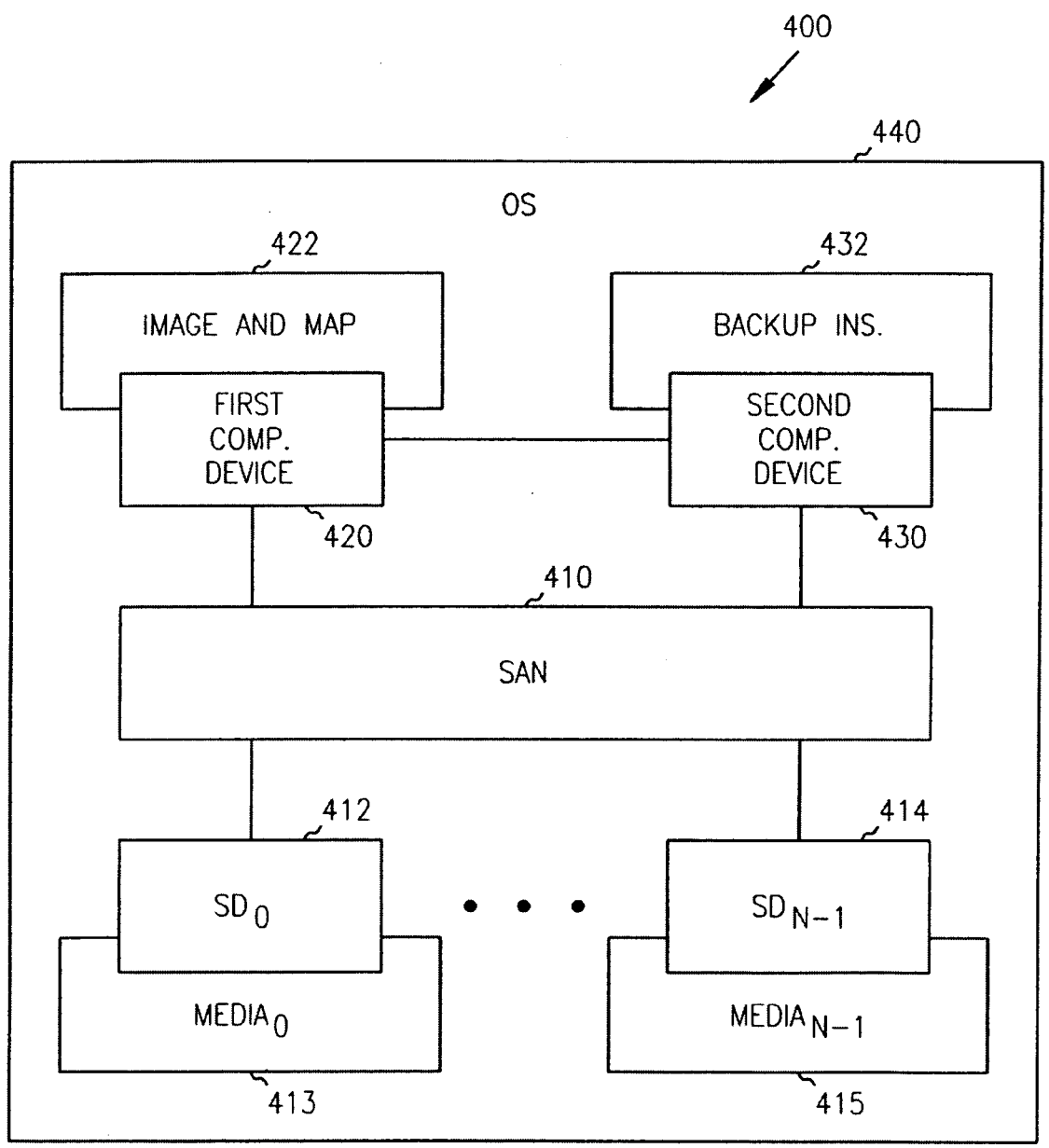
FIG. 4 shows one diagram of a data backup system according to the present invention.

FIG. 4 illustrates one diagram of one data backup system 400 according to the present invention. The system 400 includes a SAN 410, a first computing device 420, and a second computing device 430. The system 400 operates on an OS platform 440. The OS platform provides OS I/O operations permitting access to storage devices $SD_0$ (412) having computer readable media$_0$ (413) and $SD_{n-1}$ (414) having computer readable media$_{n-1}$ (410). The storage devices $SD_0$ (412) and $SD_{n-1}$ (414) are managed by the SAN 410 and accessible to the first computing device 420 and the second computing device 430.

Target data resides on the storage devices $SD_0$ (412) and $SD_{n-1}$ (414), the target data is data identified as being the object of a data backup operation occurring within the SAN 410 and initiated on the first computing device 420. The first computing device 410 includes a frozen image 422 of the target data. The frozen image 422 is a stabilized version of the target data after receiving a data backup operation, such that the all data altering operations pending when a data backup operation is received are completed and flushed from memories as needed to stabilize the target data before completing the data backup operation. Once a frozen image is obtained, a map 422 is derived representing all the necessary information needed to directly access the target data on the storage devices $SD_0$ (412) and $SD_{n-1}$ (414). As one skilled in the art will appreciate, the map 422 includes storage extents and storage addresses, the extents and addresses can be relative or absolute.

The second computing device 430 includes a backup set of executable instructions 432 that backs up the target data within the SAN 410 by using the map 422 received from the first computing device 420. The backup set of executable instructions 432 uses OS platform 440 I/O instructions to backup the target data. In some embodiments, the I/O operations are read and write operations. In more embodiments, the second computing device 430 using the backup set of executable instructions 432 is notified by the first computing device 420 that the frozen image or map 422 has been altered before the I/O operations are initiated to the data backup. In these embodiments, a remap operation is performed on the first computing device 420 such that the first computing device sends only the changes to the map 422, which have occurred since the map 422 was originally sent to the second computing device 430.

The OS platform 440 I/O operations result in the target data being copied or backed up to computer readable media 413 and/or 415. In some embodiments the media 413 and/or 415 is an optical disk, magnetic disk, magnetic tape, magnetic cartridge, and the like. The first computing device 420 and the second computing device 430 are connected and interfaced to the SAN 410. Moreover, in some embodiments the first computing device 420 and the second computing device 430 are optionally interfaced directly with one another in addition to the SAN 410 connectivity. In this way, the first computing device 420 and the second computing device 430 can directly communicate with one another. In some embodiments, no direct connection between the first computing device 420 and the second computing device 430 exist at all, and communication of the map 422 is achieved via shared storage devices 412 and/or 414 which are directly accessible by each computing device 420 or 430.

CONCLUSION

The methods and systems discussed above permit more efficient data backups in a shared computing environment. Conventional approaches perform data backup operations using the initiating computing device requesting the data backup within the shared computing environment. Alternatively, conventional approaches use SCSI extended copy operations where the initiating computing device sends a series of complex SCSI descriptors to a SCSI node that processes the data backup operation. Neither of the conventional approaches efficiently offloads any substantial processing from the initiating computing device desiring the data backup. Furthermore neither of the conventional approaches provides storage extents, storage addresses, or storage maps to a second computing device that represent the data to be backed up in the shared storage environment.

Conversely, the present invention provides stable storage extents, storage addresses, and storage maps to represent the data to be backed up. The storage extents, storage addresses, and storage maps are provided to a separate computing device different from the initiating computing device for data backup processing. Moreover, the operations used to perform the data backup are OS provided I/O operations and not traditional customized device interface operations. As one of ordinary skill in the art will appreciate, the present invention therefore provides an improved data backup operation by better offloading processing, representing the data, and using existing OS provided operations.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method to backup data, comprising:
   initiating, at a first computing device, a backup operation to backup a specified set of target data;
   identifying, from the first computing device, one or more physical storage addresses corresponding to the specified set of target data;
   transmitting the one or more physical storage addresses to a second computing device; and
   completing the backup operation from the second computing device, wherein said completing comprises:
      determining, prior to backing up data from a particular physical storage address of the one or more physical storage addresses, whether the particular physical storage address remains valid for the specified set of target data; and
      if the particular physical storage address is no longer valid,
         obtaining a new physical storage address to access data that was previously accessible at the particular physical storage address;
         issuing input/output (I/O) operations to copy data from the new physical storage address to non-volatile storage.

2. The method of claim 1, wherein the target data comprises at least one of a file, a set of files, a file system, a set of file systems, a volume, or a set of volumes.

3. The method of claim 1, wherein the first and second computing devices are interfaced with a storage area network (SAN).

4. The method of claim 1, wherein the I/O operations include a read operation and a write operation.

5. The method of claim 1, wherein the non-volatile storage comprises a magnetic tape device.

6. The method of claim 1, wherein the I/O operations are provided by an operating system in use at the second computing device, wherein the operating system is Unix, Windows 2000, Windows XP, Windows NT, Linux, HP-UX, AIX, Solaris, Netware, or OS/2.

7. The method of claim 1, wherein in issuing the I/O operations, a read operation requires parameters derived from the one or more physical storage addresses, wherein the parameters include a storage device identifier, a starting block within a storage device identified by the storage device identifier, and a total number of blocks to read within the storage device beginning at the starting block.

8. The method of claim 1, wherein said completing further comprises:
   if the particular physical storage address remains valid, issuing I/O operations to copy data from the particular physical storage address to non-volatile storage.

9. The method of claim 1, wherein said determining whether the particular physical storage address remains valid for the specified set of target data comprises detecting whether a configuration identifier associated with a version of the specified set of target data has changed.

10. A system for backing up data, comprising:
    a first computing device, and
    a second computing device;
    wherein the first computing device is configured to:
       initiate a backup operation to backup a specified set of data;
       identify one or more physical storage addresses corresponding to the specified set of data;
       provide the one or more physical storage addresses to the second computing device; and
    wherein the second computing device is configured to:
       complete the backup operation, wherein said completing comprises:
          determining, prior to backing up data from a particular physical storage address of the one or more physical storage addresses, whether the particular physical storage address remains valid for the specified set of target data;
          if the physical storage address is no longer valid,
             obtaining a new physical storage address of data that was previously accessible at the particular physical storage address;
             issuing input/output (I/O) operations to copy data from the new physical storage address to non-volatile storage.

11. The system of claim 10, wherein said completing further comprises:
    if the particular physical storage address remains valid, issuing I/O operations to copy data from the particular physical storage address to non-volatile storage.

12. The system of claim 10, wherein said determining whether the particular physical storage address remains valid for the specified set of target data comprises detecting whether a configuration identifier associated with the specified set of target data has changed.

13. The system of claim 10, wherein the one or more physical storage addresses correspond to physical storage locations of a transactionally consistent version of the specified set of data.

14. The system of claim 10, wherein the one or more physical storage addresses correspond to a frozen image of the specified set of data.

15. The system of claim 10, wherein the first computing device incorporates a first operating system, and wherein the second computing device incorporates a second operating system different from the first operating system.

16. The system as recited in claim 10, wherein the one or more physical storage addresses comprise at least one absolute extent and at least one relative extent.

17. A computer-readable storage medium comprising program instructions to implement a backup service, wherein the instructions are computer-executable to:
    initiate, at a first computing device, a backup operation to backup a specified set of data;
    identify, at the first computing device, one or more physical storage addresses corresponding to the specified set of data;
    provide the one or more physical storage addresses from the first computing device to a second computing device; and
    complete the backup operation from the second computing device, wherein said completing comprises:
       determining, prior to backing up data from a particular physical storage address of the one or more physical storage addresses, whether the particular physical storage address remains valid for the specified set of target data;
       if the particular physical storage address is no longer valid,
          obtaining a new physical storage address of data that was previously accessible at the particular physical storage address;

issuing input/output (I/O) operations to copy data from the new physical storage address to non-volatile storage.

18. The computer-readable storage medium of claim 17, wherein said completing further comprises:

if the physical storage address remains valid, issuing (I/O) operations to copy data from the particular physical storage address to non-volatile storage.

19. The computer-readable storage medium of claim 17, wherein said determining whether the physical storage address remains valid for the specified set of target data comprises detecting whether a configuration identifier associated with the specified set of target data has changed.

20. The computer-readable storage medium of claim 17, wherein the one or more physical storage addresses correspond to physical storage locations of a transactionally consistent version of the specified set of data.

21. The computer-readable storage medium of claim 17, wherein the one or more physical storage addresses correspond to a frozen image of the specified set of data.

22. The computer-readable storage medium of claim 17, wherein the physical storage address corresponds to a location at a first storage device linked to a storage area network (SAN), and wherein in completing the backup operation, the second computing device copies the data from the physical storage address to a location at a second storage device linked to the SAN.

* * * * *